(12) United States Patent
Orcutt et al.

(10) Patent No.: US 12,349,053 B2
(45) Date of Patent: Jul. 1, 2025

(54) DETERMINING NETWORK COVERAGE AND NETWORK BANDWIDTH VIA BLOCKCHAIN ENABLED ESIM/UE SYSTEMS

(71) Applicant: DISH Wireless L.L.C., Englewood, CO (US)

(72) Inventors: Jennings Maxwell Orcutt, Denver, CO (US); Christopher William Krasny Ergen, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 459 days.

(21) Appl. No.: 17/963,620

(22) Filed: Oct. 11, 2022

(65) Prior Publication Data

US 2024/0121707 A1    Apr. 11, 2024

(51) Int. Cl.
*H04W 48/18*    (2009.01)
*H04W 8/08*    (2009.01)

(52) U.S. Cl.
CPC ............. *H04W 48/18* (2013.01); *H04W 8/08* (2013.01)

(58) Field of Classification Search
CPC ................................ H04W 48/18; H04W 8/08
USPC ....................................................... 370/329
See application file for complete search history.

(56) References Cited

U.S. PATENT DOCUMENTS

2019/0150150 A1 *  5/2019  Calin ................ H04W 72/0453
                                                    370/329
2022/0190886 A1 *  6/2022  Islam .................. H04W 72/044

FOREIGN PATENT DOCUMENTS

WO    WO-2022090315 A1 *  5/2022

* cited by examiner

*Primary Examiner* — Huy C Ho
(74) *Attorney, Agent, or Firm* — Fish & Richardson P.C.

(57) ABSTRACT

This disclosure relates to determining network coverage and/or network bandwidth. In some aspects, a method includes detecting, by a user device, one or more signals at a particular location, each of the one or more signals corresponding to a wireless network available at the particular location; for each particular wireless network available at the particular location, transmitting multiple data packets over the particular wireless network; collecting, in response to transmitting the multiple data packets, network parameters associated with transmission of the multiple data packets over the particular wireless network; transmitting, to a server, (i) the network parameters associated with the particular wireless network and (ii) location data identifying the particular location; and receiving, in response to transmitting the network parameters and the location data, information indicative of a reward being assigned to a user account associated with the user device.

20 Claims, 5 Drawing Sheets

DETERMINING NETWORK COVERAGE AND NETWORK BANDWIDTH VIA BLOCKCHAIN ENABLED ESIM/UE SYSTEMS

TECHNICAL FIELD

This specification generally relates to wireless communication.

BACKGROUND

Coverage of cellular networks can be location-specific. A particular location may be within the coverage area of multiple networks, but the network parameters such as signal strength and/or available bandwidth can be different for different networks.

SUMMARY

In one aspect, this document describes a method for determining network coverage and/or network bandwidth. The method includes detecting, by a user device, one or more signals at a particular location, each of the one or more signals corresponding to a wireless network available at the particular location; for each particular wireless network available at the particular location, transmitting, by the user device, multiple data packets over the particular wireless network; collecting, by the user device in response to transmitting the multiple data packets, network parameters associated with transmission of the multiple data packets over the particular wireless network; transmitting, by the user device to a server, (i) the network parameters associated with the particular wireless network and (ii) location data identifying the particular location; and receiving, by the user device in response to transmitting the network parameters and the location data, information indicative of a reward being assigned to a user account associated with the user device.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the network parameters is indicative of at least one of: bandwidth, speed, latency, and throughput of the particular wireless network. In some implementations, the reward comprises cryptocurrency.

In some implementations, the user device communicates with the server using an application running on the user device. The user device comprises an operator profile that allows the application to access a radiofrequency (RF) frontend and antennas of the user device. In some implementations, the application enables the user device to scan a public land mobile network (PLMN) comprising a combination of wireless networks provided by a particular operator.

In some implementations, the user device comprises an applet included in a subscriber identity module (SIM) of the user device, the applet allowing the SIM to access a RF frontend of the user device.

In some implementations, the method includes connecting, by the user device, with an Internet of things (IoT) device located within a predetermined range of the particular location; receiving, from the IoT device a data payload associated with the IoT device; transmitting, by the user device, at least a portion of the data payload of the IoT device to a destination device using a wireless network available to the user device; and in response to transmitting the at least a portion of the data payload of the IoT device, receiving, by the user device, information indicative of a second reward being assigned to the user account associated with the user device.

In some implementations, transmitting the at least a portion of the data payload of the IoT device includes: encrypting, by the user device, data included in the data payload of the IoT device; and transmitting, by the user device, the encrypted data to the destination device. In some implementations, the user device connects with the IoT device using one of BLUETOOTH, WIFI, NFC, NBIOT, CAT-M, or LORA.

In another aspect, this document describes a method for determining network coverage and/or network bandwidth. The method includes receiving, from a user device at one or more computing devices, network parameters associated with one or more wireless networks available at a particular location, wherein the network parameters pertain to interaction of the user device with the one or more wireless networks at the particular location; in response to receiving the network parameters, assigning, by the one or more computing devices, a reward to a user account associated with the user device; identifying, by the one or more computing device, a particular wireless network at the particular location based on one or more network parameters of the particular wireless network satisfying a threshold; and transmitting, by the one or more computing device, a selection of the particular wireless network to user devices at the particular location In some implementations, the user devices at the particular location use network service of the particular wireless network by default.

Particular implementations of the subject matter described in this disclosure can be implemented so as to realize one or more of the following advantages.

Network coverage and/or network parameters can be determined by receiving network parameters from various user devices in a crowdsourcing mechanism. In some implementations, the user devices can scan for and process available signals of cellular networks at different geographical locations. The user devices can collect data on network coverage (e.g., signal strength) and/or one or more network parameters (e.g., bandwidth, throughput etc.), and send such data to a remote computing system, such as a server. Such information may be usable in efficiently routing cellular traffic. For example, in situations where there exists an option of using one of multiple available cellular networks (e.g., networks provided/administered by different vendors), the data on network coverage and/or network parameters may be used to determine an efficient/reliable way of routing calls and data packets. In some implementations, the data on network coverage and/or network parameters may be used, for example, to determine need/feasibility of adding additional towers or cells in certain areas to improve the network coverage or the network quality. Collection of such data on network coverage and/or network parameters by the user-devices can be incentivized, for example, by assigning a reward/benefit to the user accounts that permit the corresponding user-devices to collect/share such information.

It is appreciated that methods and systems in accordance with the present disclosure can include various combinations of the aspects and features described herein. That is, methods and systems in accordance with the present disclosure are not limited to the combinations of aspects and features specifically described herein, but also may include other combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Network coverage and/or network bandwidth can be used to verify the quality of network services provided by service providers. Furthermore, such data can be used to determine networks with one or more network parameters not satisfying a respective threshold. In situations where a particular user device, e.g., mobile device, can connect to a single network, information about network coverage and/or bandwidth has only limited usability. However, in situations where a particular mobile device has the option of connecting to one of multiple networks, information about network coverage and/or available bandwidth of individual networks can be helpful in choosing the best/optimal network. This in turn can improve throughput and/or connectivity, allowing for efficient routing of data/voice from the mobile device. The technology described herein can leverage crowdsourced data from various user devices to collect the network coverage (e.g., signal strength) and network parameters (e.g., bandwidth, throughput, etc.) in different locations. In the crowdsource mechanism, user are motivated to provide permissions to the users' devices such that the user devices are allowed to collect and send such network coverage and network parameters to a server by receiving rewards. The server can use the received network parameters to verify the quality or the capability of the network services.

Figure 1:
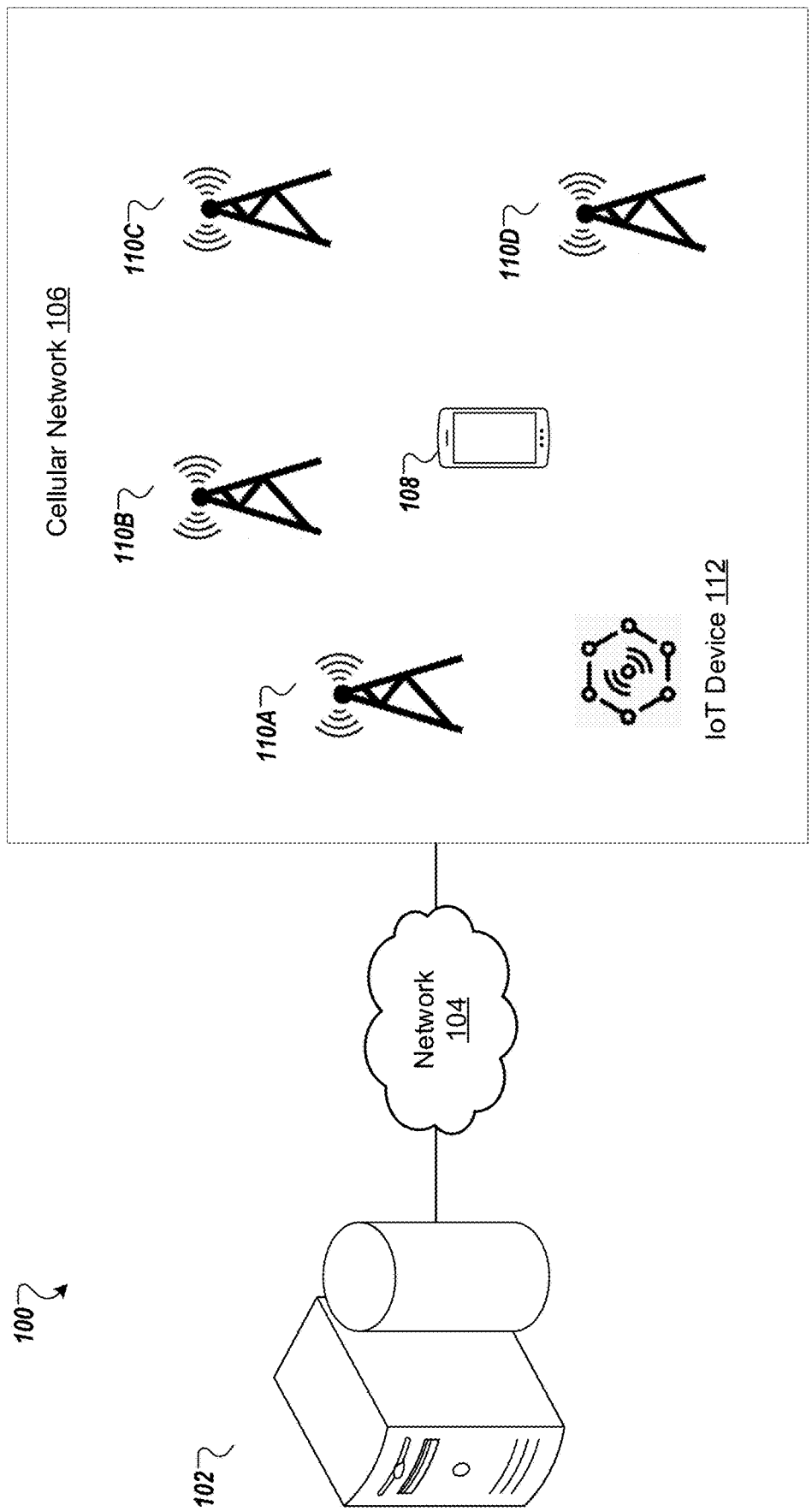
FIG. 1 is a block diagram of an example environment for determining network coverage and/or network bandwidth.

FIG. 1 is a block diagram of an example environment 100 for determining network coverage and/or network bandwidth in accordance with technology described herein. The example environment 100 includes a server 102, a network 104, a cellular network 106, and one or more user devices 108. The cellular network 106 can include a plurality of cell towers 110. In some implementations, the example environment 100 can include one or more Internet of things (IoT) devices 112.

Each cell tower 110 can be a base station that includes antennas and electronic communication equipment to create a cell in the cellular network 106. The cell tower 110 can include one or more sets of transceivers, digital signal processors, control electronics, a GPS receiver, and any other communication equipment. A cell tower 110 can be shared by multiple cellular providers. For example, one cell tower 110 can include multiple antennas for different frequencies of different cellular networks. For instance, the cell tower 110A can include a transceiver for signal S1. The cell tower 110D can include a set of transceivers for signals S1, S2, S3 and S4. The different cellular networks can be provided by different service providers.

In some implementations, some of the cellular networks may have limited coverage or capability in different geographical locations. The user devices 108 can test the available wireless networks by transmitting multiple data packets over each wireless network and collecting network parameters. A user device 108 at a certain location can scan and detect available signals of different cellular networks provided by different service providers. The user device 108 can collect information of the detected signals to evaluate and prove the coverage of the different cellular networks at the particular location. For example, the user device 108 may detect the signals of a 4G network provided by service provider A, and signals of a 5G network provided by a service provider B, at a particular location. In some examples, the collected information of each detected signal can include received signal strength indication (RSSI), the signal strength in the unit of dBm, reference signal received power (RSRP), reference signal received quality (RSRQ), technology used, and the like. The user device 108 can also collect location data, for example, through location services. The user device 108 can send the location data and the information of the signals detected at the corresponding location to the server 102 over the network 104, such as Internet.

In some implementations, the user devices 108 can obtain the network coverage and/or network parameters of the available cellular networks by testing the available cellular networks. Assume the user device 108 detected signals of a 5G network at a particular location, the user device 108 can transmit multiple data packets over the 5G network. The user device 108 can monitor and collect network parameters associated with transmission of the multiple data packets over the 5G network. In some implementations, the network parameters can include monitored data regarding the data transmission, such as the packet size, transmission delay, packet loss, bit rate, and the like. After testing the available wireless networks at the particular location, the user device 108 can send the monitored network parameters of the available wireless network and the corresponding location data to the server 102 over the network 104.

In some implementations, the network parameters can be indicative or can include at least one of network capability, such as bandwidth, speed, latency, and throughput of the wireless network. In some examples, the network capability can be calculated using the monitored network parameters. The calculation of the network capability can be performed by the user devices 108. In some examples, the calculation of the network capability can be performed by the server 102. The user devices 108 can transmit the monitored network parameters to the server 102. The server 102 can calculate the network capability, such as bandwidth, speed, latency, and throughput of the network, based on the monitored network parameters.

The server 102 can be a computing system including one or more computing devices. The server 102 can communicate with the user devices 108 using an application running on the user devices 108. For example, the server 102 can provide an application that is downloaded and installed on the user devices 108. The application running on the user devices 108 can enable the user device 108 to scan the available signals of different wireless networks, test the available wireless networks, and send the network coverage and network parameters to the server 102.

In some implementations, the server 102 can connect to the cellular network through the network 104, such as Internet. In some examples, the cellular network can include a core network, such as a mobile core that provides Internet connectivity for both data and voice services of the cellular network.

The server 102 can receive the network coverage and network parameters from the user devices 108 over the network 104. The server 102 can assign a reward to a user account associated with the user device 108. In some examples, the reward can be cryptocurrency. In some implementations, the reward can be a discounted roaming rate or another form of reward. Because user accounts associated with various user devices 108 can receive a reward for collecting and transmitting the network coverage and network parameters, the users are motivated to provide permissions such that the user devices 108 are allowed to share information, such as network coverage and network parameters. The server 102 can thus obtain the network coverage and network parameters from a large number of user devices 108 in a crowdsourcing mechanism. As discussed above, the network parameters can include the network capability data, such as bandwidth, speed, latency, and throughput of the network. The server 102 can have the knowledge of the network coverage and network capability of different networks at different locations in real time.

The server 102 can leverage such knowledge to enable the user devices 108 to switch network service to a default network at a certain location. The default network can be a wireless network with the best network capability or a wireless network with a network parameter satisfying a threshold. For example, where multiple wireless networks are available at a particular location, the server 102 can identify a particular wireless network at the particular location based on a network parameter of the particular wireless network satisfying a threshold. The server 102 can transmit a selection of the particular wireless network to user devices at the particular location such that the user devices preferentially connect to the particular wireless network when in that particular location. In some implementations, the particular wireless network may be assigned as a default wireless network at the particular location. The user devices at the particular location can switch the network service to the default wireless network. In some implementations, the default wireless network can be a wireless network with the best network capability, such as a wireless network with the highest available bandwidth at the particular location at a given time. In some implementations, the default wireless network at a particular location can be different at different times.

In some implementations, the network parameters of a network can indicate that one or more network parameters of the network are below a respective threshold. Based on the network parameters of each network at a particular location, it can be determined that there is no network coverage at the particular location, or the network capability is poor at the particular location. The server 102 can transmit such network parameters to one or more administrative devices (not shown). So that an additional cell tower can be added at the corresponding location. Alternatively or additionally, an additional cell can be added at the corresponding location.

In some implementations, the IoT device 112 can be a device that has a data payload, but has not yet transmitted that payload due to lack of network access. A user device 108 at a particular location can securely connect with the IoT device 112, when the IoT device 112 is located within a predetermined range of the particular location. In other words, when the distance between the user device 108 and the IoT device 112 is within a threshold, the user device 108 can connect with the IoT device 112. The user device 108 can then serve as an intermediary device and route the payload of the IoT device 112 to the network 104, such as Internet. For example, the user device 108 can receive the data payload associated with the IoT device 112, and transmit at least a portion of the data payload of the IoT device 112 to a destination device (not shown) using a wireless network available to the user device 108.

In some implementations, the user device 108 can be configured to package/repackage the payload of the IoT device based on the requirements of the wireless network available to the user device 108. For example, the network available to the user device 108—corresponding to the user device SIM (subscriber identity module) card—can be a 3G, 4G, or 5G wireless network. The user device 108 can package the data payload of the IoT device 112 into data packets of a network type corresponding to the available network. For example, the user device 108 can package the data payload of the IoT device 112 into 3G, 4G, or 5G data packets depending on whether the user device has access to a 3G, 4G, or 5G network, respectively. In some implementations, the user device 108 can encrypt the data included in the data payload of the IoT device 112 to obtain encrypted data. The user device 108 can transmit the encrypted data to the destination device.

In some implementations, a user account associated with the user device 108 can receive a reward from the server 102 for transmitting the data payload of the IoT device 112. For example, in response to transmitting the at least portion of the data payload of the IoT device 112, the user device 108 can receive information indicative of a reward being assigned to the user account associated with the user device. In some examples, the reward can be cryptocurrency. In some implementations, the reward can be a discounted roaming rate, a roaming credit, or another reward. The user account can be a bank account, a brokerage account, a wireless network service account, or another account that can be configured to accept the reward.

In some implementations, the amount of the reward can be based on the quality of the network parameters provided by the user device. As discussed above, the network parameters can include parameters indicative of the network capability, such as bandwidth, speed, latency, and throughput of the network, based on the monitored network parameters. In some implementations, the network parameters can further include collected information of each detected signal, such as received signal strength indication (RSSI), the signal strength in the unit of dBm, reference signal received power (RSRP), reference signal received quality (RSRQ), technology used, and the like. If a user device provides a package of data that includes a full list of the network parameters, the reward assigned to the user account associated with the user device can be a full amount. If a user device provides only part of the network parameters, the reward assigned to the user account associated with the user device can be less than the full amount. In some implementations, each network parameter can be associated with a weight value that indicate an importance level of the parameter. A reward amount for each network parameter can be in accordance with the weight value of the parameter, e.g., a network parameter with a higher weight value corresponds to a higher reward amount. The amount of the reward for the user device can be determined based on a combination or a summation of the reward amount for each received network parameter in accordance with the weight value of the corresponding parameter.

In some implementations, the user device 108 can connect with the IoT device 112 using one of BLUETOOTH, WIFI, near field communication (NFC), Narrowband Internet of things (NBIOT), Category M (CAT-M), or long range radio (LORA).

The server 102 can maintain a database that includes locations, detected available signals or available networks at respective locations, and the network coverage and network parameters. In some implementations, the database can be stored in cloud storage. The server 102 can access the database from the cloud storage over the network 104.

The server 102 can include one or more computing devices. The various functional components of the server 102 may be installed on one or more computers as separate functional components or as different modules of a same functional component. For example, the various components of the server 102 can be implemented as computer programs installed on one or more computers in one or more locations that are coupled to each through a network. In cloud-based systems for example, these components can be implemented by individual computing nodes of a distributed computing system.

The user device 108 is an electronic device that is capable of communicating over the network 104. The network 104 can include a local area network ("LAN"), wide area network ("WAN"), the Internet, or a combination thereof. Example user devices 108 can include personal computers, mobile communication devices, e.g., smart phones, and other devices that can send and receive data over the network 104. The user device 108 can also include a digital assistant device. The digital assistant can be implemented in different forms of hardware devices including, a wearable device (e.g., watch or glasses), a smart phone, a speaker device, a tablet device, or another hardware device.

Figure 2:
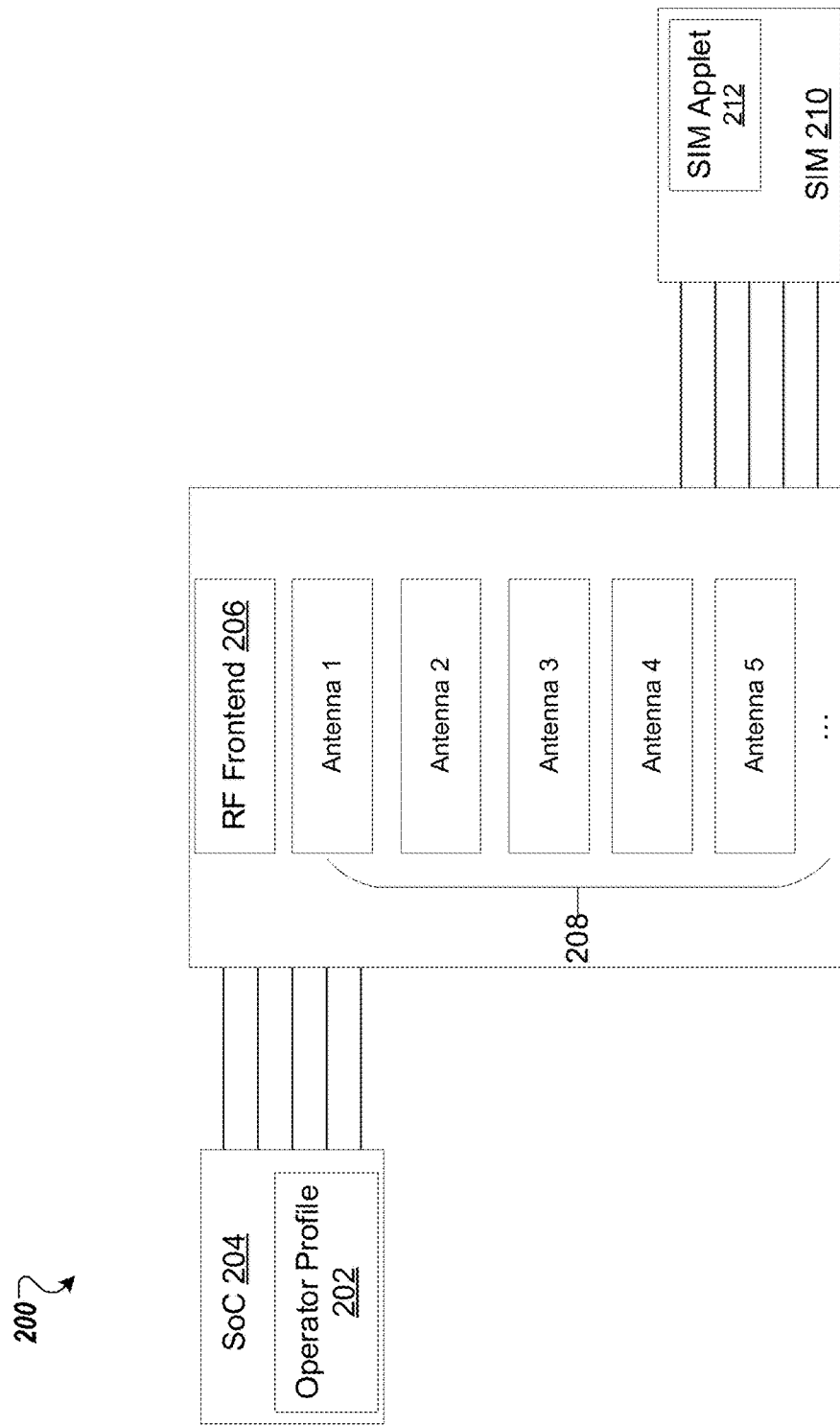
FIG. 2 is a block diagram of an example environment for configuring a user device used in determining network coverage and/or network bandwidth.

FIG. 2 is a block diagram of an example environment 200 for configuring a user device used in determining network coverage and/or network bandwidth. As discussed above, the user device can communicate with the server using an application running on the user device. The user device can include an operator profile 202 that allows the application to access a radio frequency (RF) frontend and antennas of the user device. The operator profile 202 can be an original equipment manufacturer (OEM) operator profile that is placed on a system on a chip (SoC) 204 included in the user device. The operator profile 202 can allow the application to access different hardware components of the user device, such as a RF frontend 206 and multiple antennas 208 included in the user device. With the operator profile 202, the application running on the user device can enable the user device to scan a public land mobile network (PLMN) that includes a combination of wireless networks provided by a particular service provider, e.g., operator. The RF frontend 206 can include components in the user device that process the signals at the original incoming radio frequencies.

The user device can include a subscriber identity module (SIM) card 210. The SIM card can be any type, such as embedded SIM (eSIM), integrated SIM (iSIM), physical SIM, embedded universal integrated circuit card (EUICC), hardware embedded SIM, and the like. The SIM card 210 can include a SIM applet 220. The SIM applet 220 can be an application whitelisted through the operator profile 202. The SIM applet 220 can allow the SIM card 210 to access the RF frontend 206 and the multiple antennas 208 of the user device. The user device can scan and access the radio frequencies of different available signals. For example, the SIM applet 220 can use the RF frontend 206 and the multiple antennas 208 to scan and access available signals from different networks or carrier types, collect information of these available signals, and send data across these network types.

Figure 3:
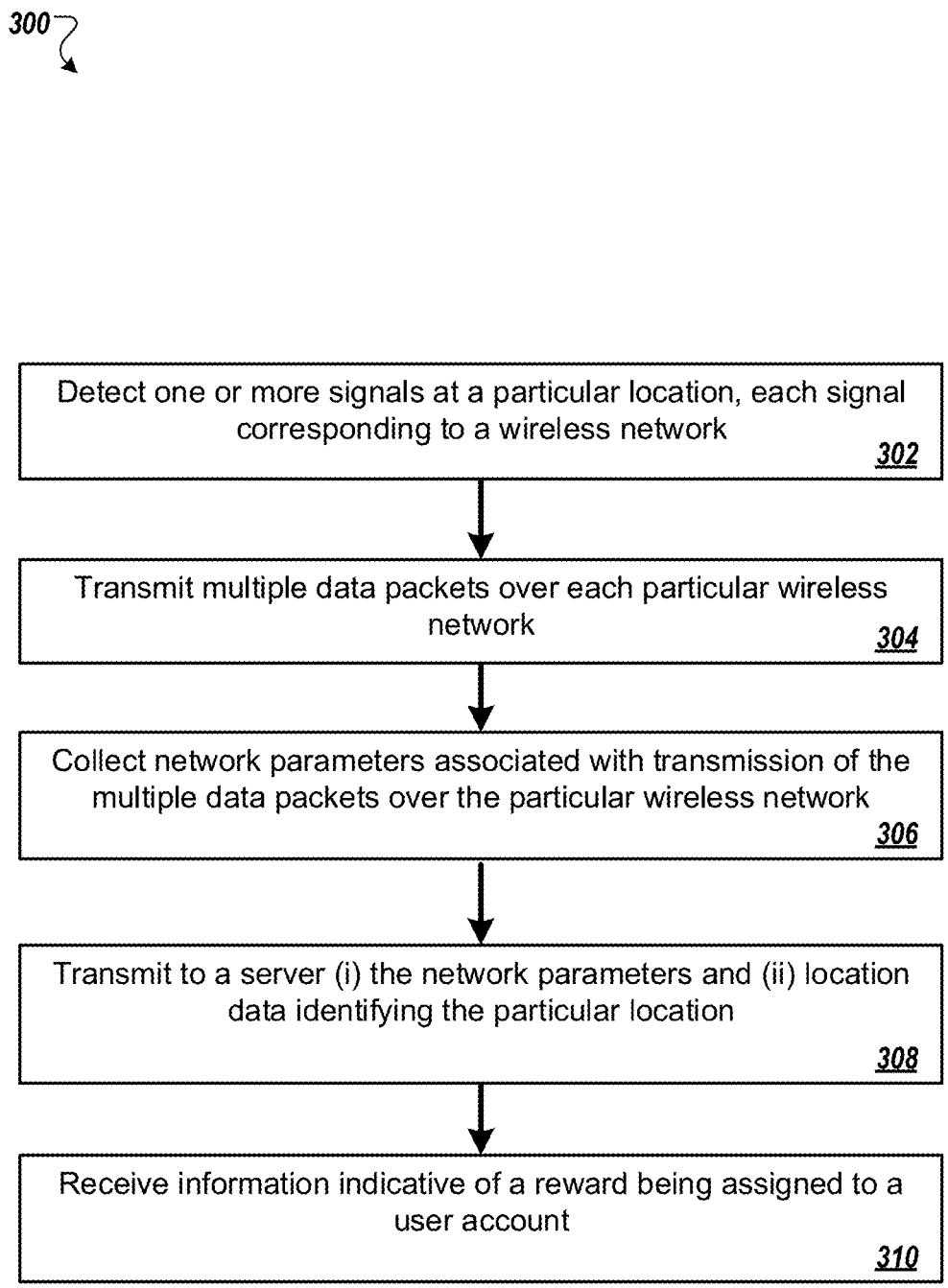
FIG. 3 is a flow diagram of an example process on a user device for providing network coverage and/or network bandwidth data.

FIG. 3 is a flow diagram of an example process 300 on a user device for providing network coverage and/or network bandwidth data. In some implementations, at least a portion of the process 300 can be executed at the user device 108.

At step 302, the user device can detect one or more signals at a particular location, each signal corresponds to a wireless network. The server can instruct the user device to detect one or more signals at the location through the application running on the user device.

At a certain location, there may be different available signals of different cellular networks. The user device at a certain location can scan and detect the available signals corresponding to different networks. The user device can collect information of the detected signals to evaluate and prove the coverage of the different cellular networks at the particular location. For example, the user device may detect the signals of a 4G network provided by service provider A, and signals of a 5G network provided by a service provider B, at a particular location.

In some examples, the collected information of each detected signal can include received signal strength indication (RSSI), the signal strength in the unit of dBm, reference signal received power (RSRP), reference signal received quality (RSRQ), technology used, and the like. The user device can also collect location data, for example, through location services, such as Global Positioning System (GPS) or other map services.

At step 304, the user device can transmit multiple data packets over each particular wireless network. The server can instruct the user device to transmit multiple data packets over each particular wireless network through the application running on the user device.

The user device can test the available wireless networks by transmitting multiple data packets over each wireless network and collecting network parameters. For example, the user device may detect signals of a 5G network at a particular location. The user device can transmit multiple data packets over the 5G network.

In some implementations, in an active mode, the user device can transmit multiple packets of user data for offloading the user data over the particular wireless network. In some implementations, in a passive mode, the user device can transmit multiple data packets of mock data over the particular wireless network.

At step 306, in response to transmitting the multiple data packets, the user device can collect network parameters associated with transmission of the multiple data packets over the particular wireless network. For example, after detecting a 5G network and transmitting multiple data packets over the 5G network, the user device can monitor and collect network parameters associated with transmission of the multiple data packets over the 5G network. In some implementations, the network parameters can include monitored raw data regarding the network transmission of the multiple data packets, such as the packet size, transmission delay, packet loss, bit rate, and the like. In some implementations, the network parameters can include or can indicative of at least one of bandwidth, speed, latency, and throughput of the network.

At step 308, the user device can transmit, to a server, the network parameters associated with the particular wireless network and location data identifying the particular location. The server can instruct the user device to transmit the network parameters and location data to the server through the application running on the user device.

In some examples, network parameters indicative of the network capability can be calculated using the monitored network parameters. In some examples, the calculation of the network capability can be performed by the user device. For instance, the user device can calculate the network parameters indicative of network capability of each available wireless network at the location and send the network parameters indicative of network capability to the server. In some implementations, the server can calculate the network parameters indicative of the network capability, such as bandwidth, speed, latency, and throughput of the network, based on the monitored network parameters. In some implementations, the network parameters can further include collected information of each detected signal, such as received signal strength indication (RSSI), the signal strength in the unit of dBm, reference signal received power (RSRP), reference signal received quality (RSRQ), technology used, and the like.

At step 310, in response to transmitting the network parameters and the location data, the user device can receive information indicative of a reward being assigned to a user account associated with the user device.

In some examples, the reward can be cryptocurrency. In some implementations, the reward can be a discounted roaming rate or another form of reward. Because user accounts associated with various user devices can receive reward for collecting and transmitting the network coverage and network parameters, the users are motivated to provide permissions such that the user devices are allowed to share information, such as network coverage and network parameters.

The reward can be assigned to a user account associated with the user device. In some examples, the user can register a new user account when the application is downloaded and installed in the user device. In some examples, the user can add an existing user account to the application. The user account can be a bank account, a brokerage account, a wireless network service account, or another account that can be configured to accept the reward.

The order of steps in the process 300 described above is illustrative only, and the process 300 can be performed in different orders. In some implementations, the process 300 can include additional steps, fewer steps, or some of the steps can be divided into multiple steps.

Figure 4:
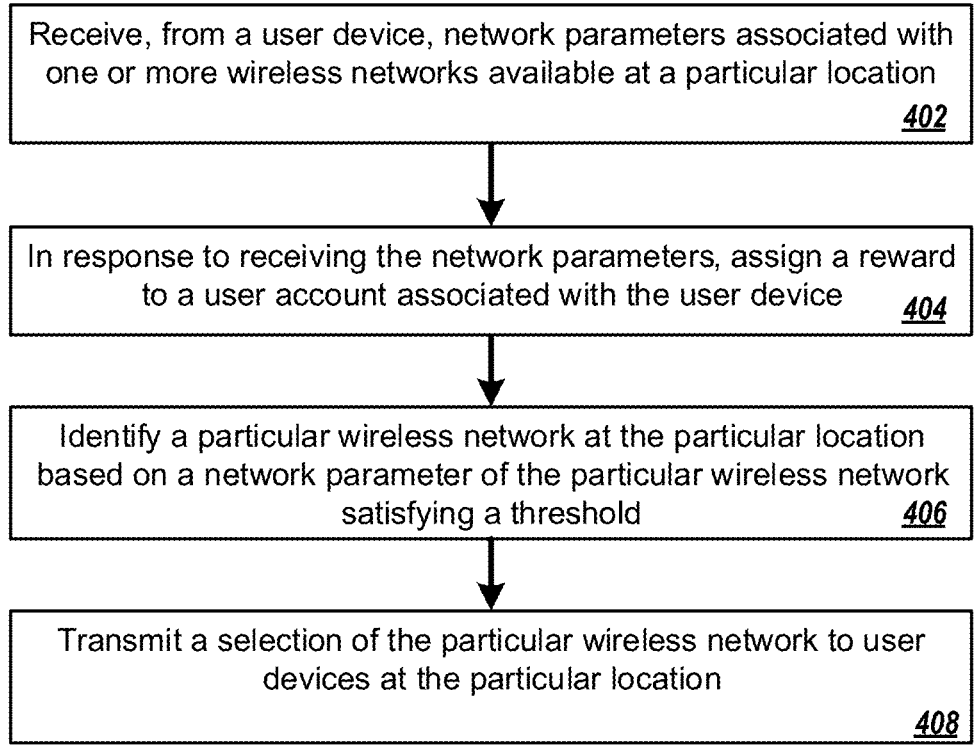
FIG. 4 is a flow diagram of an example process on a server for determining network coverage and/or network bandwidth.

FIG. 4 is a flow diagram of an example process on a server for determining network coverage and/or network bandwidth. In some implementations, at least a portion of the process 400 can be executed at the server 102.

At step 402, receive, from a user device, network parameters associated with one or more wireless networks available at a particular location. The network parameters pertain to interaction of the user device with the one or more wireless networks at the particular location.

The server can receive the network parameters from different user devices at different locations. As discussed above, the user device can send the monitored network parameters regarding data transmission on the available networks, to the server over the network, e.g., Internet. The user device can also transmit the location data to the server over the network. The server can thus obtain the network coverage and network parameters from a large number of user devices in a crowdsourcing mechanism. As discussed above, the network parameters can include data on network capability, such as bandwidth, speed, latency, and throughput of the network. The server can have the knowledge of the network coverage and network parameters of different wireless networks at different locations in real time.

At step 404, in response to receiving the network parameters, the server can assign a reward to a user account associated with the user device.

After receiving the network coverage and network parameters from the user device, the server can assign the reward to the user account associated with the user device. In some examples, the reward can be cryptocurrency. In some implementations, the reward can be discounted roaming rate or another form of reward.

By assigning a reward a user account associated with each user device for scanning and testing the available wireless networks at a certain location, the server can motivate the user to provide permission such that the user device is allowed to participate in the crowdsourcing mechanism. The server can thus obtain the network coverage data and network parameters of different networks at different locations from a large number of user devices.

In some implementations, the server can assign a reward to the user account associated with user devices for transmitting data payload of IoT devices. As discussed above, a user device can serve as an intermediary device and route the payload of the IoT device to the network, such as Internet, using a wireless network accessible to the user device. The server can assign a reward to user accounts of such user devices to motivate the users to provide permissions such that the user devices are allowed to serve as intermediary devices for transmitting the payload of IoT devices.

At step 406, the server can identify a particular wireless network at the particular location based on a network parameter of the particular wireless network satisfying a threshold. The identified wireless network can be a wireless network with the best network capability or a wireless network with a network parameter satisfying a threshold. For example, where multiple networks are available at a particular location, the server can identify a particular wireless network with the highest bandwidth or with a bandwidth satisfying a threshold.

At step 408, the server can transmit a selection of the particular wireless network to user devices at the particular location. The user devices at the particular location can use the network service of the particular network by default. The particular wireless network can serve as the default wireless network at the particular location. The user devices at the particular location can switch network service to the default wireless network at the particular location.

Because the server has the knowledge of the network coverage and network parameters of different wireless networks at different locations in real time, the server can leverage such knowledge to enable the user devices to switch network service to a default wireless network at a certain location. The default network can be a wireless network with the best network capability or a wireless network with a network parameter satisfying a threshold. For example, where multiple networks are available at a particular location, the server can transmit the selection of a particular wireless network with the highest bandwidth to user devices at the particular location, and enable the user devices to switch the network service to the particular wireless network at the particular location. In some implementations, the default wireless network at a particular location can be different at different times. For example, at one time, Network A can have the highest bandwidth and serve as the default wireless network. At another time, network A can have a high volume of network traffic and have a large transmission delay. In this case, network A may not serve as the default wireless network. A different wireless network, e.g., network B may serve as the default wireless network. By monitoring the network parameters of different wireless networks in real time, the server can determine which wireless network serves as the default network at each location. This in turn can improve throughput and/or connectivity, allowing for efficient routing of data/voice from the user devices.

In some implementations, the network parameters of a network can indicate that one or more network parameters of the network are below a respective threshold. Based on the network parameters of each network at a particular location, it can be determined that there is no network coverage at the particular location, or the network capability is poor at the particular location.

In some examples, the server can transmit such network parameters below a threshold to one or more administrative devices. So that an additional cell tower can be added at the corresponding location. Alternatively or additionally, an additional cell can be added at the corresponding location.

The order of steps in the process 400 described above is illustrative only, and the process 400 can be performed in different orders. In some implementations, the process 400 can include additional steps, fewer steps, or some of the steps can be divided into multiple steps.

Figure 5:
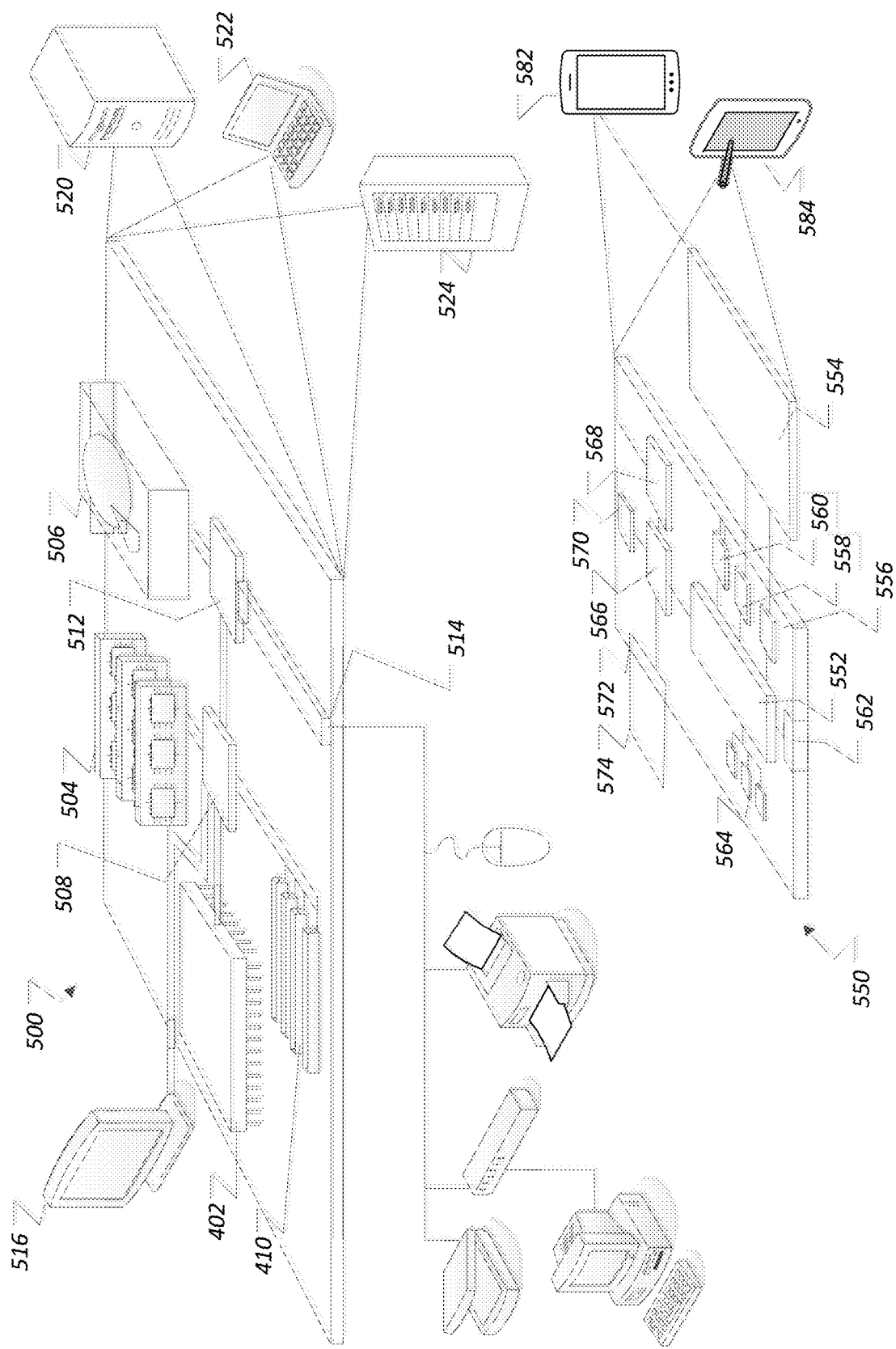
FIG. 5 illustrates block diagrams of example computing devices.

FIG. 5 shows an example of a computing device 500 and a mobile computing device 550 (also referred to herein as a wireless device) that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 500 and/or the mobile computing device 550 can form at least a portion of the server 102 and the user device 108 described above.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented in the device 108 described in FIG. 1. Other implementations may include a phone device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

The invention claimed is:

1. A computer-implemented method comprising:
   detecting, by a user device, one or more signals at a particular location, each of the one or more signals corresponding to a wireless network available at the particular location;
   for each particular wireless network available at the particular location,
      transmitting, by the user device, multiple data packets over the particular wireless network;
      collecting, by the user device in response to transmitting the multiple data packets, network parameters associated with transmission of the multiple data packets over the particular wireless network;
      transmitting, by the user device to a server, (i) the network parameters associated with the particular wireless network and (ii) location data identifying the particular location; and
      receiving, by the user device in response to transmitting the network parameters and the location data, information indicative of a reward being assigned to a user account associated with the user device.

2. The computer-implemented method of claim 1, wherein the network parameters is indicative of at least one of: bandwidth, speed, latency, and throughput of the particular wireless network.

3. The computer-implemented method of claim 1, wherein the reward comprises cryptocurrency.

4. The computer-implemented method of claim 1, wherein the user device communicates with the server using an application running on the user device, wherein the user device comprises an operator profile that allows the application to access a radiofrequency (RF) frontend and antennas of the user device.

5. The computer-implemented method of claim 4, wherein the application enables the user device to scan a public land mobile network (PLMN) comprising a combination of wireless networks provided by a particular operator.

6. The computer-implemented method of claim 1, wherein the user device comprises an applet included in a subscriber identity module (SIM) of the user device, the applet allowing the SIM to access a RF frontend of the user device.

7. The computer-implemented method of claim 1, further comprising:
   connecting, by the user device, with an Internet of things (IoT) device located within a predetermined range of the particular location;
   receiving, from the IoT device a data payload associated with the IoT device;
   transmitting, by the user device, at least a portion of the data payload of the IoT device to a destination device using a wireless network available to the user device; and
   in response to transmitting the at least a portion of the data payload of the IoT device, receiving, by the user device, information indicative of a second reward being assigned to the user account associated with the user device.

8. The computer-implemented method of claim 7, wherein transmitting the at least a portion of the data payload of the IoT device comprises:
   encrypting, by the user device, data included in the data payload of the IoT device; and
   transmitting, by the user device, the encrypted data to the destination device.

9. The computer-implemented method of claim 7, wherein the user device connects with the IoT device using one of BLUETOOTH, WIFI, NFC, NBIOT, CAT-M, or LORA.

10. A computer-implemented method comprising:
    receiving, from a user device at one or more computing devices, network parameters associated with one or more wireless networks available at a particular location, wherein the network parameters pertain to interaction of the user device with the one or more wireless networks at the particular location;
    in response to receiving the network parameters, assigning, by the one or more computing devices, a reward to a user account associated with the user device;
    identifying, by the one or more computing device, a particular wireless network at the particular location based on one or more network parameters of the particular wireless network satisfying a threshold; and
    transmitting, by the one or more computing device, a selection of the particular wireless network to user devices at the particular location.

11. The computer-implemented method of claim 10, wherein the user devices at the particular location use network service of the particular wireless network by default.

12. A non-transitory computer-readable medium encoded with instructions that, when executed by one or more computers, cause the one or more computers to perform operations comprising:
    detecting, by a user device, one or more signals at a particular location, each of the one or more signals corresponding to a wireless network available at the particular location;
    for each particular wireless network available at the particular location,
       transmitting, by the user device, multiple data packets over the particular wireless network;
       collecting, by the user device in response to transmitting the multiple data packets, network parameters associated with transmission of the multiple data packets over the particular wireless network;
       transmitting, by the user device to a server, (i) the network parameters associated with the particular wireless network and (ii) location data identifying the particular location; and
       receiving, by the user device in response to transmitting the network parameters and the location data, information indicative of a reward being assigned to a user account associated with the user device.

13. The non-transitory computer-readable medium of claim 12, wherein the network parameters is indicative of at least one of: bandwidth, speed, latency, and throughput of the particular wireless network.

14. The non-transitory computer-readable medium of claim 12, wherein the reward comprises cryptocurrency.

15. The non-transitory computer-readable medium of claim 12, wherein the operations comprise:
    connecting, by the user device, with an Internet of things (IoT) device located within a predetermined range of the particular location;
    receiving, from the IoT device a data payload associated with the IoT device;
    transmitting, by the user device, at least a portion of the data payload of the IoT device to a destination device using a wireless network available to the user device; and in response to transmitting the at least a portion of the data payload of the IoT device, receiving, by the user device, information indicative of a second reward being assigned to the user account associated with the user device.

16. The non-transitory computer-readable medium of claim 15, wherein transmitting the at least a portion of the data payload of the IoT device comprises:
encrypting, by the user device, data included in the data payload of the IoT device; and
transmitting, by the user device, the encrypted data to the destination device.

17. A system comprising one or more computers and one or more storage devices on which are stored instructions that are operable, when executed by the one or more computers, to cause the one or more computers to perform operations comprising:
detecting, by a user device, one or more signals at a particular location, each of the one or more signals corresponding to a wireless network available at the particular location;
for each particular wireless network available at the particular location,
transmitting, by the user device, multiple data packets over the particular wireless network;
collecting, by the user device in response to transmitting the multiple data packets, network parameters associated with transmission of the multiple data packets over the particular wireless network;
transmitting, by the user device to a server, (i) the network parameters associated with the particular wireless network and (ii) location data identifying the particular location; and
receiving, by the user device in response to transmitting the network parameters and the location data, information indicative of a reward being assigned to a user account associated with the user device.

18. The system of claim 17, wherein the network parameters is indicative of at least one of: bandwidth, speed, latency, and throughput of the particular wireless network.

19. The system of claim 17, wherein the reward comprises cryptocurrency.

20. The system of claim 17, wherein the operations comprise:
connecting, by the user device, with an Internet of things (IoT) device located within a predetermined range of the particular location;
receiving, from the IoT device a data payload associated with the IoT device;
transmitting, by the user device, at least a portion of the data payload of the IoT device to a destination device using a wireless network available to the user device; and
in response to transmitting the at least a portion of the data payload of the IoT device, receiving, by the user device, information indicative of a second reward being assigned to the user account associated with the user device.

* * * * *